United States Patent [19]

Rivera

[11] 4,262,289
[45] Apr. 14, 1981

[54] SEISMIC TREMOR SENSOR ALARM

[76] Inventor: José D. C. Rivera, G.P.O. Box 4322, San Juan, P.R. 00936

[21] Appl. No.: 947,775

[22] Filed: Oct. 2, 1978

[51] Int. Cl.³ .............................................. G08B 21/00
[52] U.S. Cl. .................................... 340/690; 74/89.14; 74/89.17; 200/61.51
[58] Field of Search ............... 340/566, 545, 690, 669, 340/683; 200/61.51, DIG. 8, DIG. 9; 74/89.17, 89.14, 29

[56] References Cited

U.S. PATENT DOCUMENTS

| 2,407,122 | 9/1946 | Young | 340/566 |
| 2,947,830 | 8/1960 | Goss | 200/61.51 |

*Primary Examiner*—Glen R. Swann, III
*Attorney, Agent, or Firm*—Oltman and Flynn

[57] ABSTRACT

The present alarm has a pendulum-operated switch apparatus including a pair of closely spaced, flexible, steel strips extending down from an insulation housing. These strips carry closely spaced, confronting switch contacts below the housing. One of these strips carries a pendulum weight at its lower end. To adjust the sensitivity of the switch, the other strip is adjustable toward the weighted strip by a metering pin operated by an adjusting screw through a gear reduction. Conductive rods extend into the housing to provide electrical connections to the upper ends of the strips. Each rod has a non-circular enlargement engaging the outer face of the corresponding strip and an inner end which is deformed laterally outward against the inner face of the strip.

8 Claims, 7 Drawing Figures

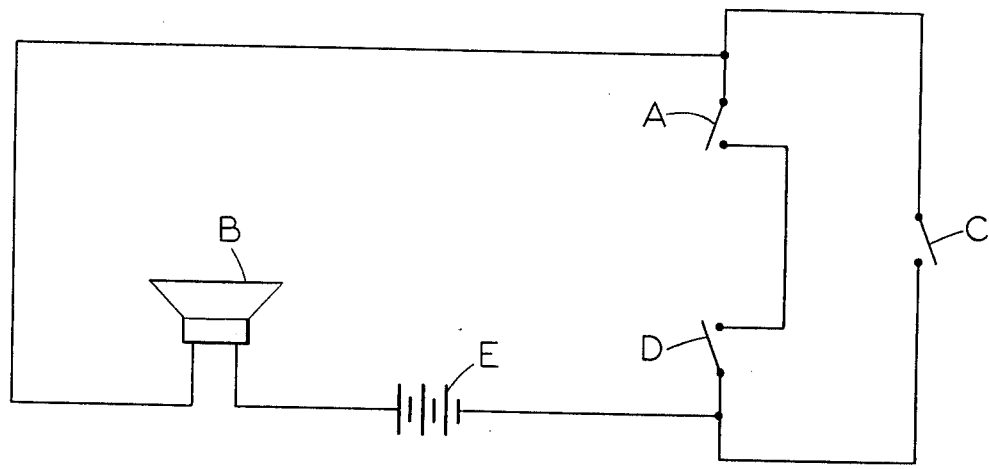
FIG. 1
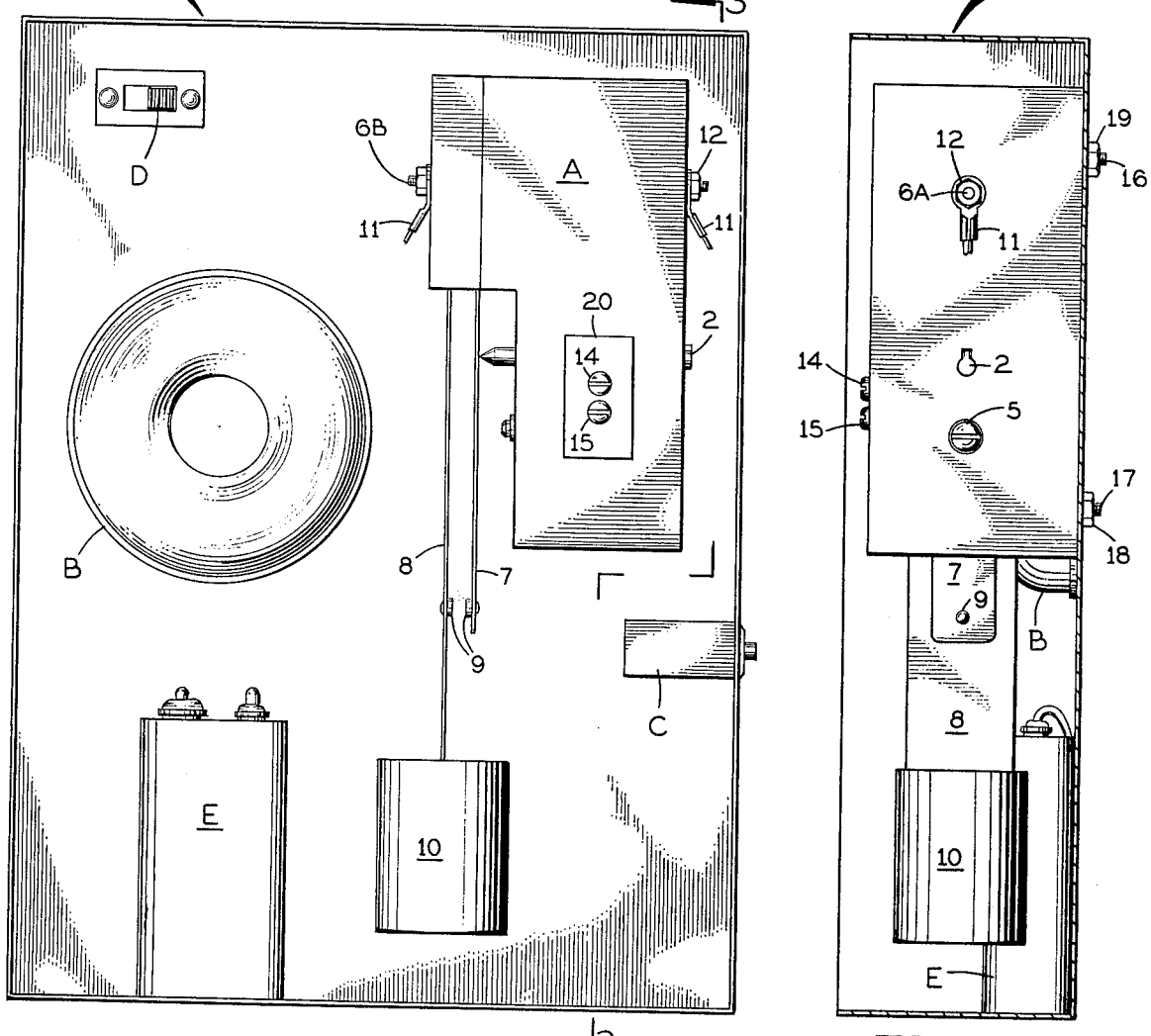

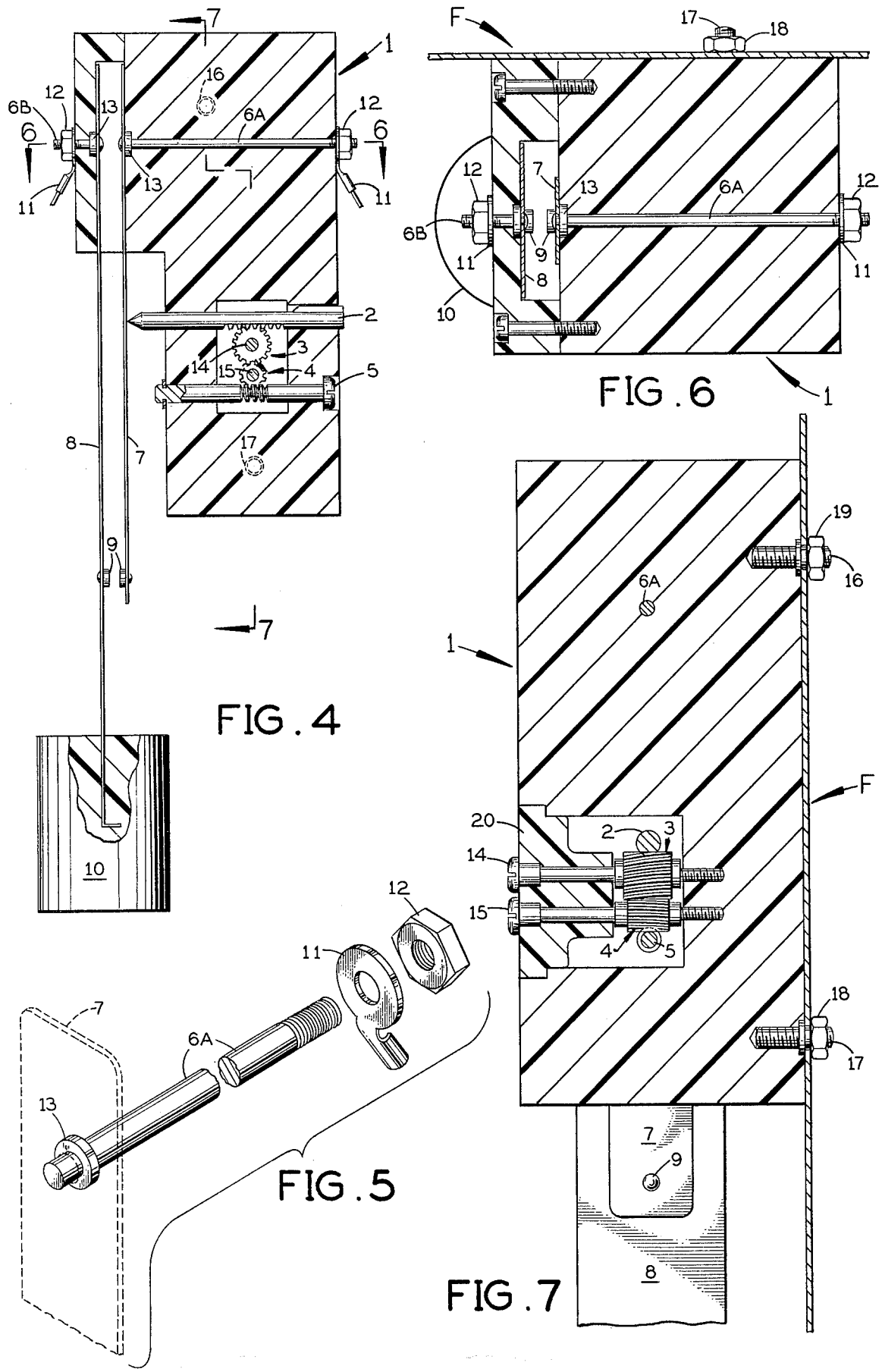

4,262,289

SEISMIC TREMOR SENSOR ALARM

SUMMARY OF THE INVENTION

The present invention relates to a pendulum-operated switch apparatus which is especially intended for the detection of earthquakes and earth tremors.

In the presently-preferred embodiment this switch apparatus comprises a pair of closely spaced, flexible, steel strips extending down from an insulation housing and one carrying a pendulum weight on its lower end. Below the housing these strips carry closely spaced, confronting switch contacts. Conductive rods extend into the insulation housing to provide electrical connections to the upper ends of the flexible strips. Each of these rods preferably has a non-circular enlargement engaging the corresponding flexible strip and snugly surrounded by the insulation housing to prevent it from turning. The rods have screw-threaded ends outside the housing which are engaged by respective nuts which clamp wiring terminals against the housing. Between these conductive rods and the switch contacts one of the flexible strips is engaged by the inner end of a pin, which adjusts it toward and away from the other flexible strip to control the normal spacing between their respective switch contacts. This pin is moved by turning an adjusting screw in the housing which is coupled to the pin through a gear reduction enabling fine adjustment of the pin.

A principal object of this invention is to provide a novel and improved pendulum-operated switch apparatus which is particularly intended for seismic detection purposes.

Further objects and advantages of this invention will be apparent from the following detailed description of a presently preferred embodiment thereof, shown in the accompanying drawings.

BRIEF DESCRIPTION OF THE DRAWINGS

This invention is illustrated in the following drawings, and more fully described.

FIG. 1 is a schematic illustration of a typical circuit embodying the pendulum-operated switch apparatus of the invention.

FIG. 2 is a vertical elevation of the components of the FIG. 1 circuit mounted.

FIG. 3 is a right side view of the pendulum-operated switch apparatus taken from the line 3—3 in FIG. 2.

FIG. 4 is a vertical elevation partly in section and parts being broken away showing the pendulum-operated switch apparatus of this invention.

FIG. 5 is a fragmentary perspective view showing the conductive rod attached to one of the flexible, switch contact-carrying strips in the FIG. 4 apparatus.

FIG. 6 is a horizontal section taken along the line 6—6 in FIG. 4.

FIG. 7 is a vertical cross-section taken along the line 7—7 in FIG. 4.

DETAILED DESCRIPTION

The drawing disclosed in FIG. 2 is an approximately full scale representation of a seismic tremor sensor alarm.

The seismic tremor alarm will alert people from major earthquakes by sensing small pre-shocks that normally take place before a large scale earthquake occurs. This unit is especially useful during night time when warning tremors can not be felt until it is too late.

Every country in the world, every once in a while registers some kind of a seismic tremor, and should cause no excitement. These are normal contractions and expansions of our planet earth. But in the event that this phenomena keeps a persistent and a definite pattern of behavior, it is indicating the normal pre-shocks before a major earthquake.

This alarm is intended to warn people of approaching danger and to avoid detriment to human life.

HOW IT WORKS

When pre-shocks occur the balance pendulum 10 is affected by earthwaves therefore closing contact points 9 and sending electric signals to buzzer B (FIG. 2) and emitting an acute and intermittent sound due to the side to side movement of the pendulum. The sensing unit will automatically stop a few seconds after movement stops.

The seismic tremor sensor can be adjusted to a desired sensivity by turning screw 5 (FIG. 4) according to the zone it is in use. The sensor can not be permanently adjusted to all zones, due to extreme changes in temperatures from the high 90° F. to the below 0° F. The function switch D (FIG. 2) is for switching the unit off for transfer purposes and to avoid disconnection when adjusting screw 5. The test switch C (FIG. 2) is for regular battery test, to make sure it is in working condition. This unit is small in size and can be affixed to any vertical wall. It's weight is approximately 16 ounces. The main housing of the components (FIG. 2) is left without design, so the manufacturer can choose the best shape for such an alarm.

OTHER SECONDARY USES

By changing the scale in the complete unit it can be used for other applications such as;

(1) In museums, to protect pictures and other valuables.

(2) In the back plate of a safe box (3) Behind a door, to prevent any break-in

FIGS. 1 and 2 are a typical set-up of the wiring diagram and component layout of the seismic tremor sensor alarm. A is the Seismic tremor sensor unit, B is a Buzzer, C is a test switch (a standard normally-open switch), D Function switch (a standard on-off switch), E is a 9 volt Battery, F is a Main housing or enclosure to accommodate A,B,C,D,E.

FIG. 3 is a right side view of the sensor unit, showing mounting screws to main enclosure F.

FIG. 4 is a vertical elevation, with parts broken away, showing two steel strips 7 and 8. Each one of the steel strips is fitted with contact point 9. Steel strip 8 is extending downward from housing 1 in a pre-set pendulum form, reaching down to lead weight 10. The strip is bent at the end to hold securely the lead weight. The steel strip 7 is extending downward from housing 1 in an adjustable form by accepting a pre-determined adjusting from metering screw 2 (FIG. 4). Screw 17 is detailed in FIG. 6 and FIG. 7.

FIG. 5 shows the outside face of the housing 1 provided with terminal post 11, which holds the end of current carrying wires when assembled. A pair of rods 6A, 6B, extending inwardly, hold terminal posts 11 with hexagonal nuts 12. Rods 6A, 6B are attached to the steel strips 7 and 8. The housing 1 in this area is solid. Rods 6A, 6B end behind 13 with a rivet holding the steel strips 7 and 8. 13 is part of the rod shaped in a hexagonal, to avoid turning while tightening nut 12. The steel strip 7 is narrower than 8, thus giving more flexibility and making contact more prolonged. (see FIG. 3)

In FIG. 4, the head of screw 16 can be seen inside of housing 1 and the threads extending outwards in FIG. 7 ready to accept the main enclosure to which all components are attached.

FIGS. 4 and 7 show the gear mechanism for fine adjustment of the sensor unit. The screw 5 is turned clockwise or counterclockwise with a regular screwdriver. By turning screw 5 it rotates gear 4 which is smaller than gear 3, and pushes metering pin 2 with a very slow motion, making adjustment very accurate. Pin 2 moves back and forward in the direction of the arrow at line B, and screw 5 is stationary, only performing a rotating motion. The housing 1 in this area is hollow.

FIG. 7 shows the gears in the front position and the metering pin 2 is against gear 3 which is fitted with screw shaft 14 Gear 3 is in contact with gear 4 which is fitted with screw shaft 15. Gear 4 is in contact with adjusting screw 5. The screw shafts 14 and 15 also hold in place cover 20. Screw 17 is molded into the housing 1 in this area. The area where screw 17 is placed is solid and holds the screw by part of its head and body, the rest of the screw 17 extending outward to accept enclosure F in FIG. 3.

I claim as of my invention:

1. In an alarm apparatus having an electrically-energizable alarm signalling device and an electrical power source for said device, a pendulum-operated switch apparatus operatively connected between said power source and said device to control the energization of said device from said power source, said switch apparatus comprising:
   a housing;
   a pair of flexible strips of electrically conductive material mounted at their upper ends in spaced relationship in said housing and extending down from the housing in closely spaced, vertically elongated, parallel relationship;
   a pair of switch contacts, on each of said strips below the housing, said contacts being in confronting, closely spaced relationship to one another;
   a pendulum weight on the lower end of one of said strips below said switch contacts;
   a pair of electrically conductive means respectively connecting the strips at the housing to said power source and said alarm signalling device for completing the circuit between said power source and said device when said switch contacts engage one another;
   a pin mounted for adjustment transverse to said strips and operatively coupled to the other of said strips to control the normal spacing between said switch contacts on the strips;
   a rotatably mounted adjusting member; and
   a reduction drive acting between said adjusting member and said pin for fine adjustment of the pin in response to turning said adjusting member.

2. An alarm apparatus according to claim 1, wherein said adjusting member is an adjusting screw rotatably mounted in said housing.

3. An alarm apparatus according to claim 2, wherein said reduction drive comprises a first gear driven by said adjusting screw and a larger second gear driven by said first gear and in driving relationship to said pin.

4. An alarm apparatus according to claim 3 wherein said adjusting screw extends parallel to said pin, and said pin has gear teeth thereon facing toward said adjusting screw and meshing with said second gear.

5. An alarm apparatus according to claim 4, wherein each of said electrically conductive means comprises:
   an electrically conductive rod extending into said housing transverse to the corresponding strip and having a non-circular enlargement which engages the outer face of said strip, said rod extending through said strip and at its inner end engaging the inner face of said strip, said rod having a screw-threaded outer end extending beyond said housing; and
   a nut threadedly engaging said screw-threaded outer end of said rod at the outside of said housing; and
   wherein:
   said housing is of electrical insulation material at said strips and said rods; and
   said housing snugly surrounds said enlargement on each rod to prevent the respective rod from turning when the corresponding nut is turned.

6. An alarm apparatus according to claim 5, wherein each rod extends through an opening in the corresponding strip and has its inner end flattened over the inner face of said strip.

7. An alarm apparatus according to claim 1, wherein at least one of said electrically conductive means comprises:
   an electrically conductive rod extending into said housing transverse to the corresponding strip and having a non-circular enlargement which engages the outer face of said strip, said rod extending through said strip and at its inner end engaging the inner face of said strip, said rod having a screw-threaded outer end extending beyond said housing; and
   a nut threadedly engaging said screw-threaded outer end of said rod at the outside of said housing; and
   wherein:
   said housing is of electrical insulation material at said strips and said rod; and
   said housing snugly surrounds said enlargement on said rod to prevent the rod from turning when the corresponding nut is turned.

8. In an alarm apparatus having an electrically-energizable alarm signalling device and an electrical power source for said device, a pendulum-operated switch apparatus operatively connected between said power source and said device to control the energization of said device from said power source, said switch apparatus comprising:
   a housing of electrical insulation material;
   a pair of flexible, electrically conductive, metal strips mounted at their upper ends in spaced relationship in said housing and extending down from the housing in vertically elongated, closely spaced, parallel relationship;
   a pair of switch contacts, one on each of said strips below the housing, said contact being in confronting, closely spaced relationship to one another;
   a pendulum weight on the lower end of one of said strips below said switch contacts;
   a pair of electrically conductive rods extending into said housing from opposite sides and having their inner ends attached conductively to the respective strips, each of said rods having its outer end extending outside said housing;

a pair of electrical terminals respectively engaging the outer ends of said rods and clamped against the outside of said housing, said terminals being connected respectively to said power source and said alarm signalling device; and means mounted in said housing operatively engaging the other of said strips below its mounting in the housing and above said switch contacts for selectively adjusting the normal spacing between said switch contacts;

the improvement wherein:

each of said rods is screw-threaded at its outer end outside the housing;

each of said rods has a non-circular enlargement engaging the outer face of the corresponding strip in the housing; and said housing snugly surrounds said enlargement on each rod to prevent the rod from turning; and further comprising a pair of nuts threadedly engaging the respective screw-threaded outer ends of the rods and clamping the respective terminals against the outside of the housing and in engagement with the respective rods.

* * * * *